United States Patent [19]
Boardman et al.

[11] Patent Number: 5,305,213
[45] Date of Patent: Apr. 19, 1994

[54] DRIVELINE TORQUE LIMIT CONTROL STRATEGY-USING SAE J1922 TYPE ENGINE CONTROL

[75] Inventors: Mark D. Boardman, Portage; Robert M. Langbo, Three Rivers, both of Mich.

[73] Assignee: Eaton Corporation, Cleveland, Ohio

[21] Appl. No.: 698,017

[22] Filed: May 9, 1991

[51] Int. Cl.$^5$ .............................................. B60K 41/04
[52] U.S. Cl. ................................ 364/424.1; 74/859; 74/866
[58] Field of Search ............... 74/858, 857, 856, 866, 74/867, 859; 364/424.1

[56] References Cited

U.S. PATENT DOCUMENTS

| | | | |
|---|---|---|---|
| 4,361,060 | 11/1982 | Smyth | 74/866 |
| 4,527,447 | 7/1985 | Richards | 74/866 |
| 4,543,855 | 10/1985 | Oetting et al. | 364/424.1 |
| 4,595,986 | 6/1986 | Daubenspeck et al. | 364/424.1 |
| 4,614,126 | 9/1986 | Edelen et al. | 74/333 |
| 4,784,019 | 11/1988 | Morscheck | 74/720 |
| 4,792,901 | 12/1988 | Mack et al. | 364/424.1 |
| 4,850,236 | 7/1989 | Braun | 74/858 |
| 4,852,006 | 7/1989 | Speranza | 364/424.1 |
| 4,860,861 | 8/1989 | Gooch et al. | 192/3.26 |
| 4,873,637 | 10/1989 | Braun | 364/424.1 |
| 4,899,607 | 2/1990 | Stainton | 74/335 |
| 4,933,851 | 6/1990 | Ito et al. | 74/858 |
| 4,991,097 | 2/1991 | Fodale et al. | 364/424.1 |
| 5,136,897 | 8/1992 | Boardman | 74/858 |
| 5,157,991 | 10/1992 | Sumimoto | 74/866 |

OTHER PUBLICATIONS

"Control Technology of Minimal Slip-Type Torque Converter Clutch" by Hiramatsu et al., SAE Technical Paper Series 850460, Feb. 25-Mar. 1, 1985, pp. 47-54.
SAE Paper No. 881830 presented Nov. 1988.
SAE Standard J1922.

*Primary Examiner*—Vincent N. Trans
*Attorney, Agent, or Firm*—H. D. Gordon

[57] ABSTRACT

A control system/method for an automated mechanical transmission system (12) is provided for limiting driveline torque to a predetermined maximum value (max_OS_torq). Driveline torque is controlled by controlled fueling of the engine (16) to limit engine speed (ES) to a maximum value (ES max) which is determined as a function of input shaft speed (IS), maximum output shaft torque (max_OS_torq), mechanical ratio (gear-ratio) of the engaged transmission gear and torque converter (20) constants (torque_ratio, K factor).

14 Claims, 4 Drawing Sheets

DRIVELINE TORQUE LIMIT CONTROL STRATEGY-USING SAE J1922 TYPE ENGINE CONTROL

BACKGROUND OF THE INVENTION

Related Applications

This application is related to co-pending U.S. patent applications:

Ser. No. 07/698,745 entitled RANGE SHIFTING ONLY FAULT TOLERANCE METHOD/SYSTEM, now U.S. Pat. No. 5,109,721;

Ser. No. 07/697,813 entitled THROTTLE CONTROL FAULT DETECTION AND TOLERANCE METHOD/SYSTEM, now U.S. Pat. No. 5,109,729;

Ser. No. 07/697,384 entitled TOOTH BUTT/BUZZ CONTROL METHOD/SYSTEM, now U.S. Pat. No. 5,099,711;

Ser. No. 07/698,752 entitled SMOOTH UPSHIFT CONTROL METHOD/SYSTEM, now U.S. Pat. No. 5,136,897;

Ser. No. 07/698,751 entitled COMPOUND POWER DOWNSHIFT METHOD/SYSTEM, now abandoned;

Ser. No. 07/697,814 entitled TORQUE CONVERTER SLIP RATE BASED SKIP POWER DOWNSHIFT CONTROL STRATEGY, now U.S. Pat. No. 5,274,553, all filed the same day, May 1, 1991, and assigned to the same assignee, Eaton Corporation, as this application.

Field of the Invention

The present invention relates to a control system and control method for controlling the operation of an automated mechanical transmission system, preferably of the type including a fuel controlled a throttle override device, such as an SAE J1922 electronic engine control, for supplying fuel to the engine in a predetermined manner to achieve a desired engine rotational speed, a torque converter, preferably a lock-up/disconnect clutch assembly and a mechanical transmission.

In particular, the present invention relates to a control system/method for an automated transmission system as described above wherein torque converter slip is controlled, by controlling engine speed, to limit driveline torque, especially in the low speed gear ratios.

Description of the Prior Art

Mechanical transmission systems of the compound range, splitter or combined range and splitter type are well known in the prior art as may be seen by reference to U.S. Pat. Nos. 4,788,889; 4,754,665 and 4,735,109, the disclosures of which are incorporated by reference.

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. Nos. 4,648,290; 4,595,986; 4,527,447; 4,711,141; 4,642,771; 4,792,901; 4,361,060; 4,140,031 and 4,081,065, the disclosures of which hereby incorporated by reference. Such systems may also be seen by reference to SAE Paper No. 831776 titled "AUTOMATED MECHANICAL TRANSMISSION CONTROLS", the disclosure of which is hereby incorporated by reference.

Fault tolerance logic routines for automatic transmissions are known as may be seen by reference to U.S. Pat. Nos. 4,922,425; 4,849,899 and 4,899,279, the disclosures of which are hereby incorporated by reference.

Automatic transmission systems including a torque converter drivingly interposed a drive engine and a mechanical change gear transmission and/or including torque converter bypass or lock-up devices are also known as may be seen by reference to U.S. Pat. Nos. 3,593,596; 4,261,216; 4,271,724; 4,351,205 and 4,375,171, the disclosures of which are hereby incorporated by reference.

Automatic mechanical transmission systems utilizing power synchronizer devices, i.e. devices independent of engine speed to provide input shaft braking and acceleration, and not manipulation of engine speed, to synchronize the transmission jaw clutch members are known in the prior art. Examples of such systems may be seen by reference to U.S. Pat. Nos. 3,478,851, 4,023,443; 4,140,031 and 4,614,126, the disclosures of which are hereby incorporated by reference.

Automatic mechanical transmission systems having a power synchronizer and also having a torque converter drivingly interposed a drive engine and the transmission input shaft, and including a torque converter lock-up/disconnect clutch assembly, are known. Examples of such systems may be seen by reference to U.S. Pat. Nos. 4,784,019 and 4,860,861 and S.A.E. Paper No. 881830 entitled "THE EATON CEEMAT (CONVERTER ENHANCED ELECTRONICALLY MANAGED AUTOMATIC TRANSMISSION)", the disclosures of which are hereby incorporated by reference.

Such transmission systems provide an automatic mechanical transmission system utilizing a mechanical change gear transmission of a structure identical or substantially identical to the structure of transmissions intended for manual usage, providing the advantages of a torque converter for vehicle start-ups and the advantages of nonslipping connection between the engine and transmission at higher vehicle speeds/gear ratios and providing relatively rapid synchronization of the transmission positive jaw clutches. By providing an automatic mechanical transmission system based upon the same, or substantially the same, mechanical change gear transmission utilized for manual transmission systems, manufacturing, inventory and maintenance cost savings are obtained. To the transmission is added, if necessary, shifting mechanisms suitable for automatic control by solenoids or the like. An example of such a shifting mechanism may be seen by reference to above-mentioned U.S. Pat. Nos. 4,361,060 and 4,899,607 and U.S. Pat. Nos. 4,873,881; 4,722,237 and 4,445,393, the disclosures of which are hereby incorporated by reference. A power synchronizer mechanism as disclosed in above-mentioned U.S. Pat. Nos. 4,614,126; 3,478,851 or 4,023,443 is also added for synchronizing the transmission positive jaw clutches.

A torque converter is drivingly interposed the drive engine and transmission. A torque converter lock-up and disconnect clutch structure is provided comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine, whenever the second clutch is engaged simultaneously with the first clutch.

When the first coupling is disengaged, regardless of the condition of the second coupling, the transmission input shaft is disconnected from the engine torque and also from the inertia of the torque converter and from the inertia of the second coupling allowing the jaw clutches to be easily disengaged, the power synchronizer mechanism to act quickly due to relatively low inertia on the input shaft and also allowing a selected gear to be pre-engaged with the vehicle at rest and in the drive condition.

Electronic and other engine fuel control systems wherein the fuel supplied to the engine may be modulated to provide a desired engine speed, regardless of the operators setting of the throttle pedal, are known in the prior art. Such systems may be seen by reference to above-mentioned U.S. Pat. Nos. 4,081,065; 4,361,060 and 4,792,901 and by reference to the SAE J1922 electronic engine control standards and related standards SAE J1708, J1587 and J1843, all of which are incorporated herein by reference.

Attempts to control driveline torque by sensing torque converter slip and using an on-off type throttle dip control are known in the prior art. These devices were not satisfactory as control was unprecise and the device caused objectionable jerking of the entire vehicle drivetrain.

With automated transmission systems of the type described, which typically have a very high torque ratio torque converter, it is desirable to limit the potentially excessively high driveline torque such system can generate at the transmission output shafts thereof.

SUMMARY OF THE INVENTION

In accordance with the present invention, the drawbacks of the prior art are overcome or minimized by the provision, in an automated mechanical transmission system of the type described, of a control system/method to limit the torque applied to the vehicle driveline (i.e. transmission output shaft torque) to a pre-set maximum value. This control is especially useful in the low speed gear ratios where the mechanical gear ratios are highest and the torque converter is normally operated in the nonlocked up or nonbypassed condition thereof.

The above is accomplished, preferably in an automatic mechanical transmission system based upon a mechanical change gear transmission to which is added shifting mechanisms suitable for automatic control, a power synchronizer mechanism as disclosed in above-mentioned U.S. Pat. Nos. 4,614,126, a torque converter drivingly interposed the drive engine and transmission, an engine fuel control system and a torque converter lock-up and disconnect clutch structure of the type described in the above-mentioned U.S. Pat. Nos. 4,784,019 and 4,860,861 by the provision of a control effective to limit output shaft torque to a predetermined maximum value by limiting engine speed as a function of gear ratio, torque converter slip and torque converter torque ratio. Preferably, engine speed is controlled by controlling fueling of the engine, such as by use of SAE J1922 electronic engine controls.

Accordingly, it is an object of the present invention to provide a new and improved automatic mechanical transmission system utilizing power synchronizer, a torque converter drivingly interposed the engine and mechanical transmission and further utilizing an improved torque converter lock-up and disconnect clutch structure.

Another object of the present invention is to provide control logic for an automated transmission system of the type described wherein engine speed is controlled to limit output shaft (driveline) torque to a predetermined maximum value.

These and other objects and advantages of the present invention will become apparent from a reading of the description of the preferred embodiment taken with the drawings.

DESCRIPTION OF THE PREFERRED EMBODIMENT

Figure 1:
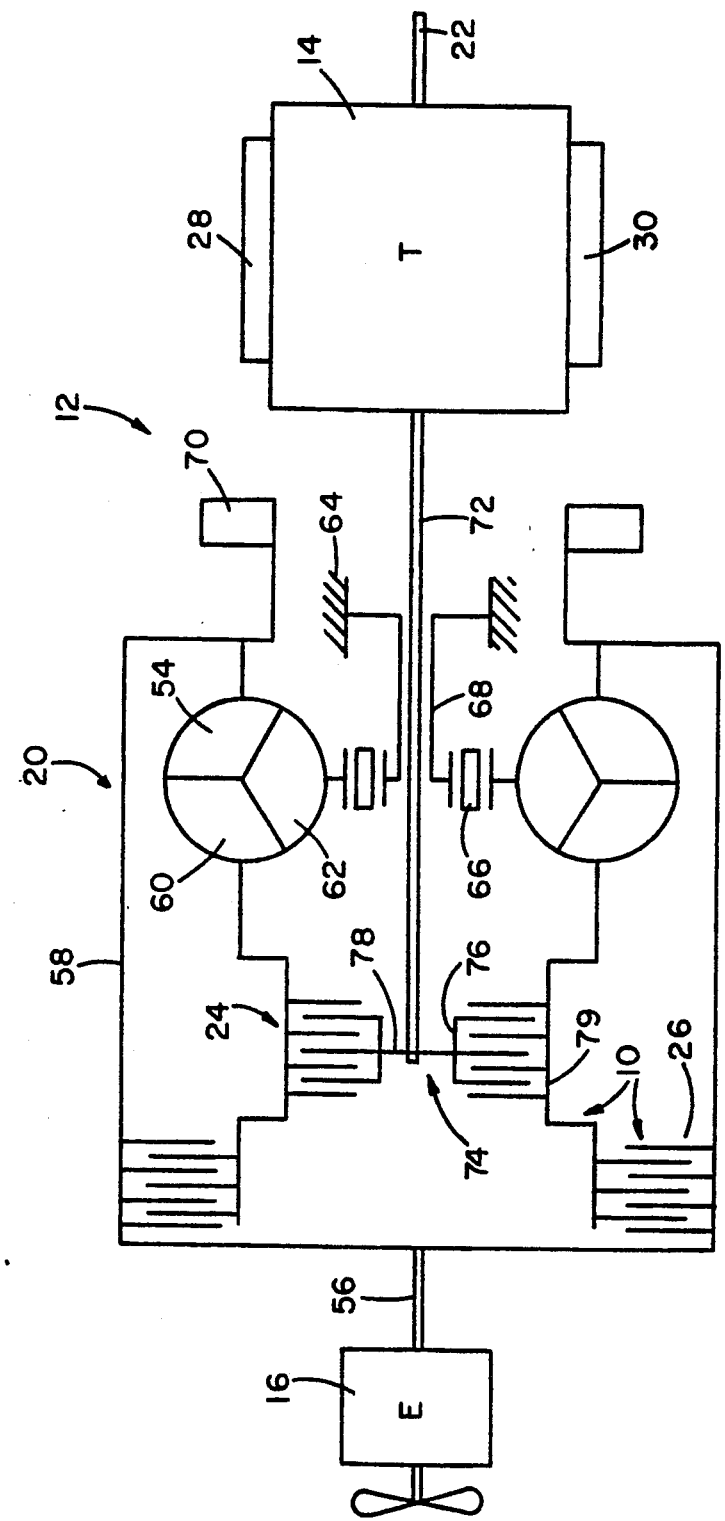
FIG. 1 is a schematic view of the torque converter and torque converter disconnect and bypass clutch structure of the present invention.

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

Figure 2:
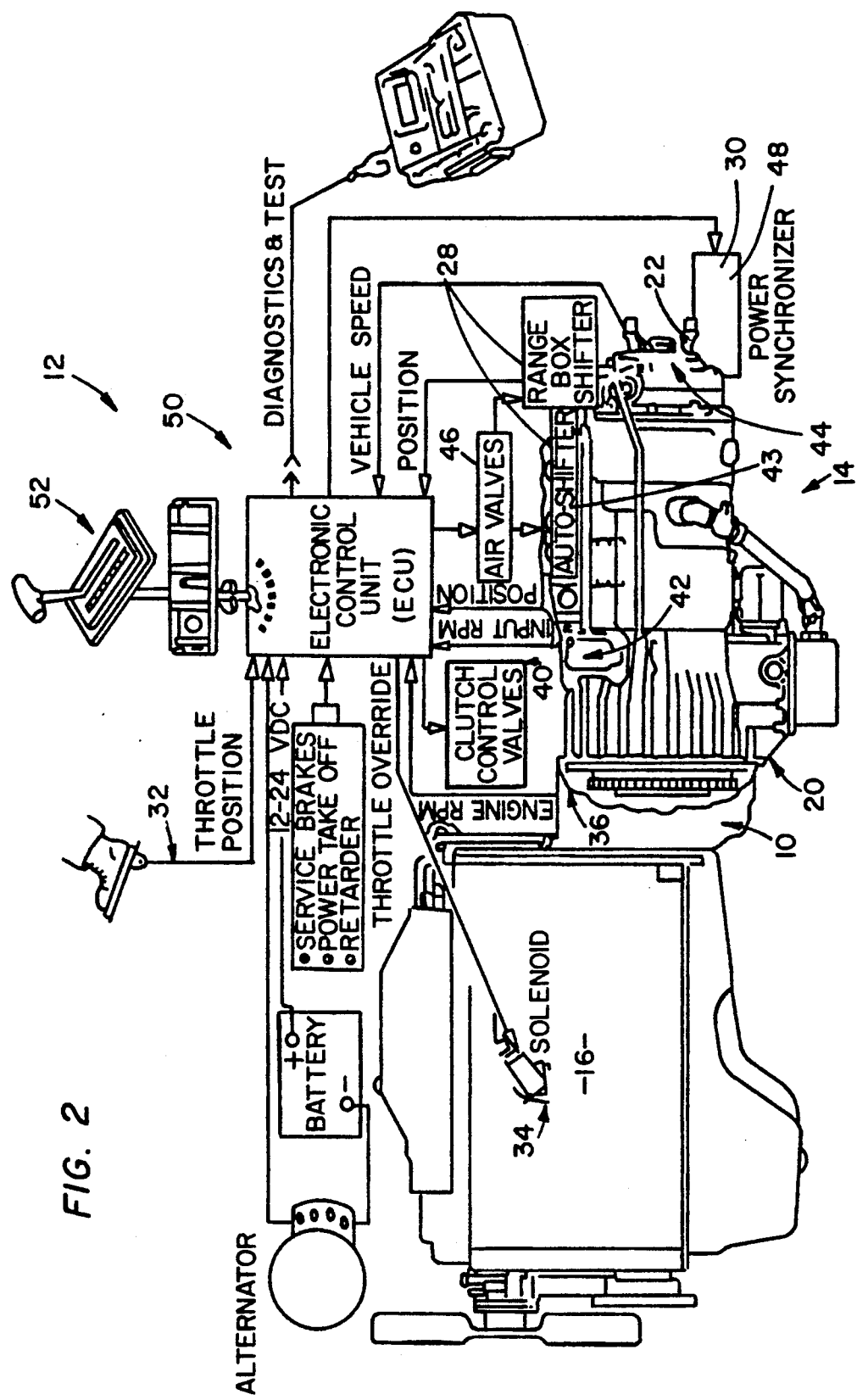
FIG. 2 is a schematic illustration of the automatic mechanical transmission system of the present invention.
Figure 3:
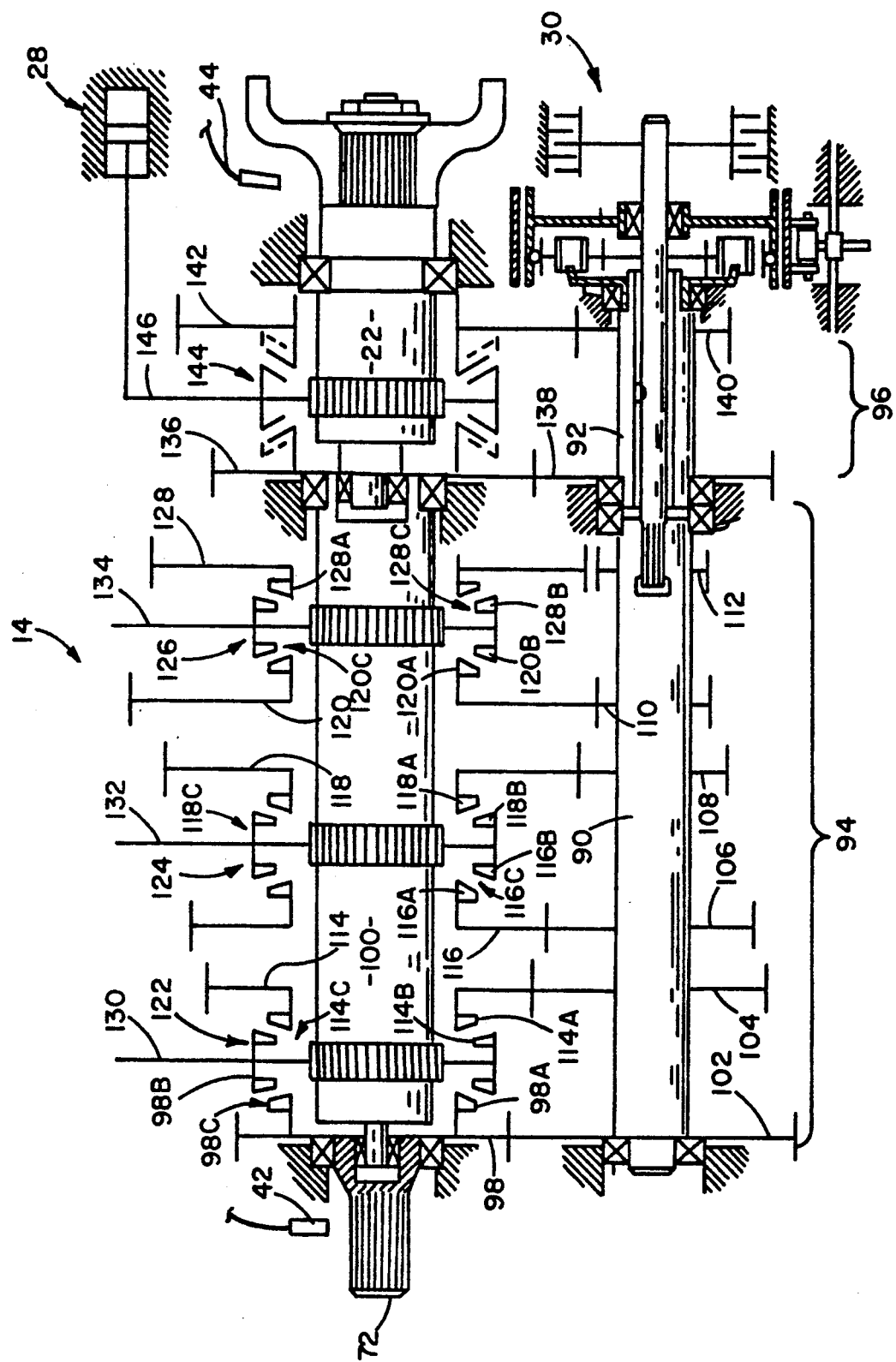
FIG. 3 is a partial view, in section, of the automatic mechanical transmission system of the present invention.

The torque converter lock-up and disconnect clutch assembly 10 and an automatic mechanical transmission system 12 utilizing same, of the present invention, are schematically illustrated in FIGS. 1, 2 and 3. The term "automatic mechanical transmission system" as used herein, shall mean a system comprising at least a throttle device controlled heat engine 16, a multi-speed jaw clutch type change gear transmission 14, a nonpositive coupling device such as a master friction clutch and/or a fluid coupling 10/20 interposed the engine and the transmission and a control unit 5 for automatically controlling same. Such systems will, of course, also include sensors and/or actuators for sending input signals to and/or receiving command output signals from the control unit.

The present invention is also well suited for use in connection with transmission systems having a torque converter without a torque converter lock-up/ disconnect clutch.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle driveline component such as the differential of a drive axle, a transfer case, or the like as is well known in the prior art.

As will be discussed in greater detail below, the torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the format of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. Nos. 3,478,851, 4,023,443 or 4,614,126.

The present invention is also applicable to automated mechanical transmission systems not utilizing a power synchronizer.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a shift fork position sensor assembly 43, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The throttle control 34 is effective to respond to command output signals from a controller to supply fuel to the engine to a set or variable level regardless of the operator's positioning of the throttle pedal. In the case of an electronic engine control conforming to above-mentioned SAE J1922 or a similar standard, the fueling of the engine may vary as necessary to obtain and/or maintain a desired engine speed.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) mode of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference.

As is well known in the operation/function of electronic control units, especially microprocessor based ECUs, the various logic functions can be performed by discrete hardwired logic units or by a single logic unit operating under different portions or subroutines of the control system logic rules (i.e. the software).

A more detailed schematic illustration of the torque converter 20 and torque converter lock-up and disconnect clutch assembly 10 drivingly interposed engine 16 and automatic change gear transmission 14 may be seen by reference to FIG. 1. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

The compound transmission 14 is illustrated in greater detail in FIG. 3 and is of the type wherein the main section countershaft or countershafts 90 are coaxially aligned with the auxiliary section countershaft or countershafts 92. Transmission 14 is of a relatively standard design and is preferably of the twin countershaft type only one of which countershafts in the main and auxiliary sections, 94 and 96, respectively, is shown. Examples of such transmissions having coaxially aligned main section and auxiliary section countershafts may be seen by reference to U.S. Pat. Nos. 3,105,395 and 3,138,965, the disclosures of which are incorporated by reference.

Transmission 14 includes input shaft 72 to which member 78 is fixed for rotation therewith and which additionally carries input gear 98 nonrotatably attached thereto. Main section countershaft 90 is substantially parallel to mainshaft 100 and is provided with countershaft gears 102, 104, 106, 108, 110 and 112 fixed for rotation therewith. A plurality of mainshaft gears, also called ratio gears, 114, 116, 118 and 120, surround the mainshaft and are selectively clutchable thereto, one at a time, by double sided positive jaw clutch collars 122, 124 and 126. Jaw clutch collar 122 may also clutch the input shaft 72 directly to the mainshaft 100 while clutch collar 126 may clutch reverse mainshaft gear 128 to the mainshaft.

The mainshaft gears 114, 116, 118 and 120 circle the mainshaft and are in continuous meshing engagement with, and are preferably supported by, opposed pairs of countershaft gears 104, 106, 108 and 110 which mounting means and the special advantages resulting therefrom are explained in greater detail in above-mentioned U.S. Pat. Nos. 3,105,395 and 3,335,616. Reverse mainshaft gear 128 is in continuous meshing engagement with countershaft gear 112 by means of conventional intermediate idler gears (not shown). The forwardmost countershaft gear 102 is continuously meshed with and driven by input gear 98 for causing rotation of countershaft 90 whenever the input gear is rotatably driven.

Clutch collar 122 carries positive jaw clutch teeth 98b and 114b which are engageable with clutch teeth 98a and 114a, respectively, to define positive jaw clutches 98c and 114c, respectively. Clutch collar 124 carries positive jaw clutch teeth 116b and 118b which are engageable with jaw clutch teeth 116a and 118a, respectively, to define positive jaw clutches 116c and 118c, respectively. Jaw clutch collar 126 carries jaw clutch teeth 120b and 128b which are positively engageable with jaw clutch teeth 120a and 128a, respectively, to define positive jaw clutches 120c and 128c, respectively.

As is known in the prior art, each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124, and 126 is provided with means for receiving a shift fork or shift yoke 130, 132 and 134, respectively, whereby the clutch collars are axially moved, one at a time only, from the positions illustrated in FIG. 3 by the actuator 28.

The auxiliary transmission section 96 includes output shaft 22 which is preferably coaxial with input shaft 72 and mainshaft 100 and is supported for rotation in a transmission housing by means of bearings. The auxiliary section also includes an auxiliary section countershaft 92 supported for rotation in the housing by means of bearings. Fixed for rotation with mainshaft 100 is the auxiliary section drive gear 136. Auxiliary section countershaft 92 carries auxiliary section countershaft gears 138 and 140 fixed for rotation therewith. Auxiliary section countershaft gear 138 is constantly meshed with auxiliary section input gear 136 while auxiliary section countershaft gear 140 is constantly meshed with output gear 142 which surrounds the output shaft 22. A synchronized clutch structure 144, of conventional individually synchronized jaw clutch design, is utilized to selectively clutch mainshaft 100 and auxiliary drive gear 136 directly to the output shaft 22 for a direct drive connection between the mainshaft and output shaft or to clutch output gear 142 to the output shaft 22 for a reduction drive of output shaft 22 from mainshaft 100 through countershaft 92 as is well known in the prior art. Synchronized clutch structure 144 is controlled by shift fork 146 axially moved by actuator 28.

Transmission 14 is of the range type wherein the auxiliary section ratio step (or steps) is greater than the total ratio coverage of the main section ratios appearing in all ranges. Such transmissions are well known in the prior art, see U.S. Pat. No. 4,754,665, the disclosure of which is hereby incorporated by reference.

The power synchronizer assembly 30 includes a planetary speed increasing gear set driven by the output shaft 22 independently of the rotational speed of the drive engine 16, and selectively actuatable to accelerate the rotational speed of transmission elements driven by the input shaft 72 for purposes of synchronous rotation of jaw clutch members associated with the gear ratio to be engaged. Preferably, the power synchronizer assembly 30 will also include means to decelerate the transmission elements driven by the input shaft. Deceleration of the transmission elements driven by the input shaft may also be achieved by input shaft and/or engine braking devices which will preferably be controlled by central processing unit 50.

The power synchronizer assembly 30 is driven by the vehicle through gear 142 which is driven directly or indirectly by output shaft 22 and thus the power synchronizer is not effective to accelerate the main section countershaft 90 when the auxiliary section is not engaged.

Details of construction and operation of the power synchronizer assembly 30 may be appreciated in greater detail by reference to above-mentioned U.S. Pat. No. 4,614,126.

Figure 4:
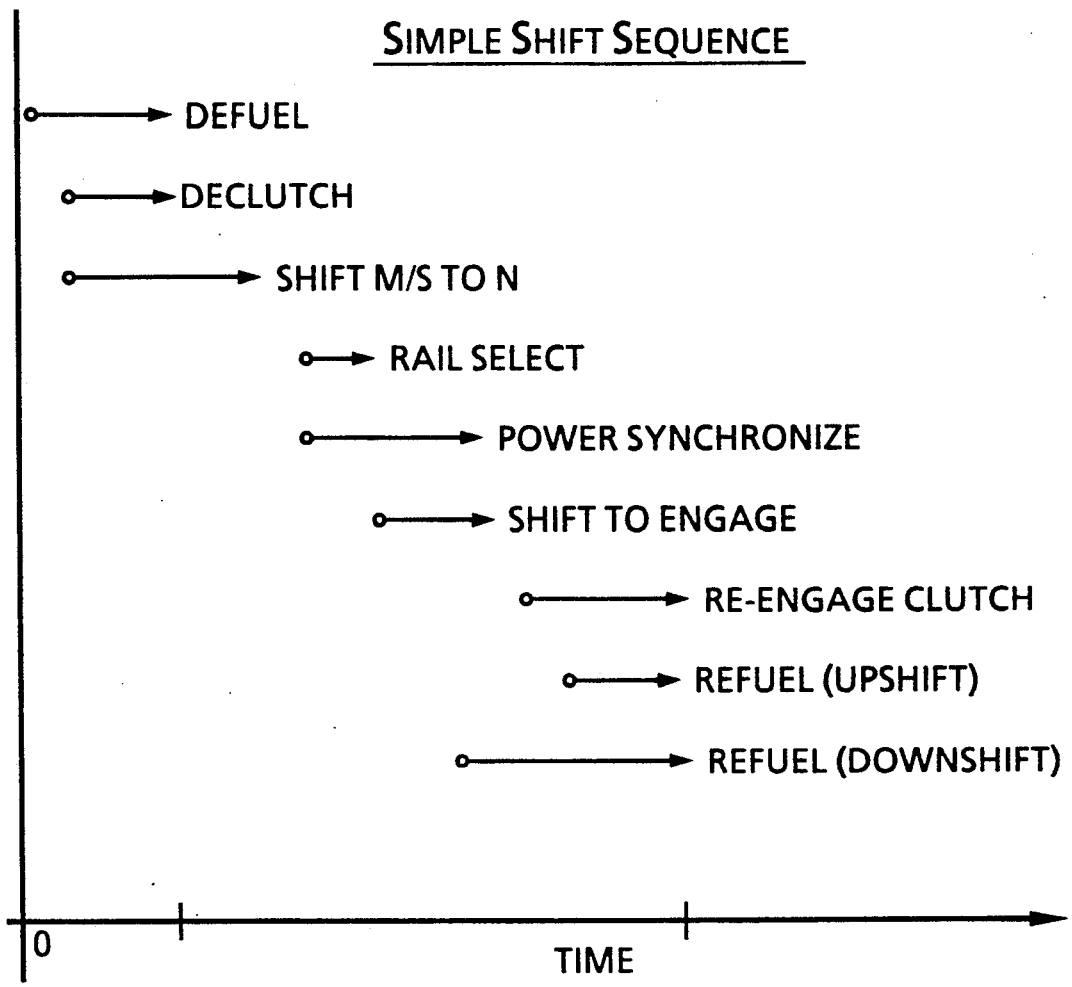
FIG. 4 is a graphical representation of a typical shift sequence for the transmission of FIG. 2.
Figure 5:
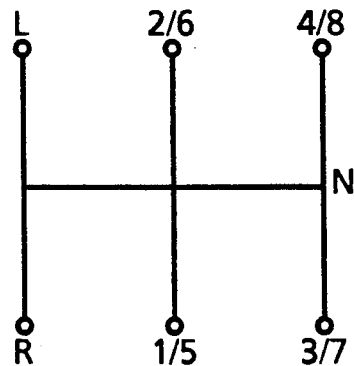
FIG. 5 is a symbolic representation of the shift pattern for the transmission of FIG. 3.

The shift sequence for a simple shift of transmission 14 in system 12 is illustrated in FIG. 4. Assuming the ECU 50 determines that a shift from second (2nd) to third (3rd) speed is required (i.e. a simple upshift), the ECU will cause fuel controller 34 to defuel (i.e. "dip") the engine regardless of the position of the throttle pedal 32. While the engine is being defueled, the disconnect clutch (or master clutch) 24 is disengaged and shift to main section 94 neutral is undertaken.

Upon defueling the engine, declutching the disconnect clutch and disengaging the main section, the power synchronizer is actuated to cause the mainshaft gearing (in this example 3rd speed mainshaft gear 114) to rotate at a target or substantially synchronous speed relative to mainshaft 100 as determined by output shaft speed and auxiliary section 96 ratio. Output shaft speed is sensed by sensor 44 while the speed of the various mainshaft gears is a known multiple of input shaft 72 speed as sensed by sensor 42.

The rail select function can occur at any time after main section disengagement and main section reengagement in the new ratio is timed to occur as the power synchronizer is bringing the engaged gear towards target speed. Of course, for an upshift the power synchronizer is normally required to retard the speed of the input shaft and associated gearing.

Upon achieving engagement of the proper main section ratio, the disconnect clutch is reengaged and the engine refueled.

Typically, a simple shift can be accomplished in about 0.70 to 0.80 seconds with a disconnect (i.e. torque break) time of about 0.50 seconds.

In a transmission system 12 of the type described, especially in systems intended for off-road and other difficult applications, the transmission 14 typically has a very high mechanical gear ratio in the low speed ratios and the torque converter 20 typically is a high ratio torque converter. Such systems, especially when operating in the low speed/high mechanical gear ratios, with the torque converters typically not locked up nor bypassed, have a potential to generate excessively high driveline (i.e. output shaft) torques. To prevent damage to the vehicle, and especially to the vehicular driveline, the control system/method of the present invention provides logic rules by which torque applied to the driveline (i.e. output shaft 22 torque) is limited to a predetermined maximum value.

In a transmission system 12 of the type described, applied driveline torque can be determined based upon the slip (TC_slip) across the torque converter 20 coupled with the mechanical ratio (gear_ratio) of each engaged gear ratio. This applied torque is set to a maximum value based on the capacity of the vehicle driveline. For a given transmission 14, the ratios are fixed therefore the parameter that may vary is the slip across the torque converter. Working from the pre-set maximum driveline torque and each ratio of the transmission, a maximum torque converter slip (TC-slip) is derived for each ratio of the transmission. This maximum torque converter slip value is used as control parameter to limit the engine speed.

The automated mechanical transmission system 12 possesses a means, fuel controller 34 acting under commands from ECU 50, by which the engine speed can be controlled through use of the SAE-J1922 or similar engine control communication link. When engaged in a particular gear and in torque converter mode (non-lockup), the engine speed is limited to the maximum allowable torque converter slip calculated for the given gear. The transmission system limits engine speed by commanding engine speed be limited to a speed equaling the sum of the RPM of the input shaft plus the maximum allowed slip, using the SAE-J1922 engine speed control mode.

To control driveline torque, several parameters are required to determine a desired engine speed (ES).

The maximum allowable driveline torque (MAX_OS torq) is a function of the specific structural features of the vehicle and is a constant. The capacity factor of the torque converter (K factor) and the torque ratio of the torque converter (torque_ratio) are also constant. The (torque_ratio) equals torque converter output torque divided by torque converter input torque.

In system 12, the (gear_ratio) of the transmission 14 is one of several known values depending upon the currently engaged speed as may be determined by reference to shift actuator position sensor 43 and/or by comparing input shaft speed (IS) to output shaft speed (OS). Torque converter slip (TC_slip) is equal to torque converter input speed minus torque converter output speed which, in system 12, is equal to engine speed (ES) minus input shaft speed (IS), assuming disconnect clutch 24 is fully nonslippingly engaged.

To determine the maximum engine speed (ES_max) in a given engaged transmission gear ratio (gear_ratio) to limit driveline torque to a predetermined maximum value (max_OS_torq):

1) maximum torque converter output torque is equal to (max_OS torq)/(gear-ratio);
2) maximum torque converter input torque is equal to maximum torque converter output torque divided by (torque_ratio); and
3) (K factor)=(TC_slip)/(Torque converter input torque)$^{.5}$; therefor maximum (TC slip) equals (K factor)*(maximum torque converter input torque)$^{.5}$; and
4) (ES_max) equals IS plus maximum (TC_slip).

By way of example, assuming a transmission system 12 utilizing an RTO-11609b transmission 14 from Eaton Corporation having a 12.56:1 mechanical gear ratio in first gear and a torque converter from Rockford Corporation having a torque ratio equal to about 2.6 and a K factor equal to about 52. Further assume that the predetermined maximum driveline torque (max_OS_torq) for the vehicle in which the system is installed has been determined to be 17500 lbs. ft.

1) The maximum torque converter output torque will equal 17500 lbs.-ft/12.56 which equals 1393 lbs.-ft.;
2) The maximum torque converter input torque will equal 1393 lbs.-ft./2.6 which equals 535 lbs.-ft.;
3) The maximum (TC_slip) (in 1st gear) equals 52*(535)$^{.5}$ which equals 1203 RPM; and
4) (ES_max) in 1st gear equals IS plus 1203.

A maximum TC_slip for each ratio, or at least the low speed ratios, is determined, and, if this ratio is exceeded, i.e. if ES IS+(max TC_slip), then a command is issued to the fuel control system to cause the engine fueling to achieve and maintain an engine speed ES equal to or less than the sum of sensed input speed (IS) plus (max TC_slip) for the engaged gear_ratio.

Referring to the above example, in first (1st) gear, if an input shaft speed of 400 RPM is sensed, and if the sensed engine speed (ES) exceeds ES_max, i.e. 400 RPM plus 1203 RPM equals 1603 RPM, the fuel control system 34 will be issued common output signals from controller 50 to decrease fuel to the engine, regardless of the position of throttle pedal sensor 32, to cause ES to equal no more than 1603 RPM.

Accordingly, it may be seen that a control system/method for the automated transmission system of the type described is provided which will control engine speed, usually by controlling fueling of the engine, to limit driveline torque to a predetermined maximum value.

It is understood that the above description of the preferred embodiment is by way of example only and that various modifications, substitutions and/or rearrangements of the parts are possible without departing from the spirit and the scope of the present invention as hereinafter claimed.

We claim:

1. A method for controlling a vehicular automated mechanical transmission system (12) for use in a vehicular driveline having known vehicular driveline characteristics, said system comprising a multiple ratio mechanical transmission (14) having an input shaft (72) and an output shaft (22), each of said ratios having a known mechanical ratio (gear_ratio) between said input and output shafts, a fuel controlled engine (16), a torque converter (20) having a known torque ratio (torque_ratio) and capacity factor (K factor) drivingly interposed the engine and the transmission, said torque converter having an input element (54) rotating in a known manner with said engine and an output element (60) rotatable in a known manner with said transmission input shaft (72), an operator set throttle control device (32), a fuel control system (34) effective in at least one mode of operation to fuel the engine to rotate at a desired rotational speed regardless of the operator's setting of the throttle control device and a central control unit (50) effective to receive input signals indicative of a status of the transmission system including at least signals indicative of (i) engine speed (ES), (ii) input shaft speed (IS) and (iii) engaged gear ratio (GR) and to process same in accordance with predetermined logic rules to issue command output signals to a plurality of system actuators including at least a fuel control system actuator, said method characterized by:

determining a maximum desirable output shaft torque (max_OS_torq) as a function of said vehicular driveline characteristics;

determining a maximum engine speed (ES_max) as a function of (i) maximum desirable output shaft torque, (ii) sensed input shaft speed, (iii) mechanical ratio (gear_ratio) of engaged gear ratio, (iv) torque converter torque ratio (torque_ratio) and (v) torque converter capacity factor (K factor) and comparing current engine speed to said maximum engine speed and, if said current engine speed exceeds said maximum engine speed, issuing command output signals to said full control system to fuel said engine for an engine speed (ES) not exceeding said maximum engine speed (ES_max).

2. The method of claim 1 wherein said torque converter input element is rotatably fixed to an engine crankshaft (56) and said torque converter output element is rotatably fixed to said transmission input shaft in at least one operational mode of said system (12).

3. The method of claim 1 or 2 wherein said maximum desirable output shaft torque (max_OS_torq) is a predetermined constant value determined as a function of vehicular driveline characteristics.

4. A method for limiting driveline torque applied to a vehicular driveline to a predetermined maximum value (max_OS_torq) in a vehicular automated mechanical transmission system (12) comprising a multiple ratio mechanical transmission (14) having an input shaft (72) and an output shaft (22), each of said ratios (gr) having a known mechanical ratio (gear_ratio) between said input and output shafts, a fuel controlled engine (16), a torque converter (20) having a known torque ratio (torque_ratio) and capacity factor (K factor) drivingly interposed the engine and the transmission, said torque converter having an input element (54) rotating in a known manner with said engine and an output element (60) rotatable in a known manner with said transmission input shaft (72), an operator set throttle control device (32), a fuel control system (34) effective in at least one mode of operation to fuel the engine to rotate at a desired rotational speed regardless of the operator's setting of the throttle control device and an electronic microprocessor based central control unit (50) effective to receive input signals indicative of a status of the transmission system including at least signals indicative of (i) engine speed (ES), (ii) input shaft speed (IS) and (iii) engaged gear ratio (GR) and to process same in accordance with predetermined logic rules to issue command output signals to a plurality of system actuators including at least a fuel control system actuator, said method characterized by:

$$ES\_max = IS + ((K\ factor) * (((max\_OS\_torq)/(gear\ ratio))/(torque\_ratio))^{.5})$$

where:
- IS = current input shaft speed;
- K factor = capacity factor of the torque converter;
- max_OS_torq = predetermined maximum driveline torque as applied at transmission output shaft, determined as a function of driveline characteristics;
- gear_ratio = mechanical ratio of currently engaged gear ratio;
- torque-ratio = torque ratio of the torque converter; and issuing command output signals to said fuel control system to fuel said engine for an engine speed (ES) not exceeding said maximum engine speed (ES_max).

5. A method for limiting driveline torque applied at a transmission output shaft to a vehicular driveline having known characteristics to a predetermined maximum value (max_OS_torq), said driveline including a vehicular automated mechanical transmission system (12) comprising a multiple ratio mechanical transmission (14) having an input shaft (72) and an output shaft (22), each of said ratios (gr) having a known mechanical ratio (gear_ratio) between said input and output shafts, a fuel controlled engine (16), a torque converter (20) having a known torque ratio (torque_ratio) and capacity factor (K factor) drivingly interposed the engine and the transmission, said torque converter having an input element (54) rotating in a known manner with said engine and an output element (60) rotatable in a known manner with said transmission input shaft (72), an operator set throttle control device (32), a fuel control system (34) effective in at least one mode of operation to fuel the engine to rotate at a desired rotational speed regardless of the operator's setting of the throttle control device and an electronic microprocessor based central control unit (50) effective to receive input signals indicative of a status of the transmission system including at least signals indicative of (i) engine speed (ES), (ii) input shaft speed (IS) and (iii) engaged gear ratio (GR) and to process same in accordance with predetermined logic rules to issue command output signals to a plurality of system actuators including at least a fuel control system actuator, said method characterized by:

predetermining as a function of said known driveline characteristics said maximum desirable output shaft torque (max_OS_torq);

predetermining a maximum torque converter slip (TC_slip) for at least one gear ratio as a function of (i) maximum desirable output shaft torque, (ii) mechanical ratio (gear_ratio) of said at least one gear ratio, (iii) torque converter torque ratio (torque_ratio) and (iv) torque converter capacity factor (K factor);

sensing current engaged gear ratio, input shaft speed (IS) and engine speed (ES); and issuing command signals to said fuel control system to fuel said engine for an engine speed (ES) not exceeding the sum of maximum torque convertor slip for said current engaged gear ratio plus input shaft speed ((max TC slip) + (IS)).

6. The method of claim 5 wherein said maximum desirable output shaft torque (max_OS_torq) is a predetermined constant value determined as a function of vehicular driveline characteristics.

7. The method of claims 5 or 6 wherein transmission is a mechanical transmission.

8. The method of claims 5 or 6 wherein said torque converter input element (54) is rotatably fixed to an engine crankshaft (56) and said torque converter output element (60) is rotatably fixed to said transmission input shaft in at least one operational mode of said system (12).

9. A control system for controlling a vehicular automated mechanical transmission system (12) comprising a multiple ratio mechanical transmission (14) having an input shaft (72) and an output shaft (22), each of said ratios having a known mechanical ratio (gear_ratio) between said input and output shafts, a fuel controlled engine (16), a torque converter (20) having a known torque ratio (torque_ratio) and capacity factor (K factor) drivingly interposed the engine and the transmission, said torque converter having an input element (54) rotating in a known manner with said engine and an output element (60) rotatable in a known manner with said transmission input shaft (72), an operator set throttle control device (32), a fuel control system (34) effective in at least one mode of operation to fuel the engine to rotate at a desired rotational speed regardless of the operator's setting of the throttle control and a central control unit (50) effective to receive input signals indicative of a status of the transmission system including at least signals indicative of (i) engine speed (ES), (ii) input shaft speed (IS) and (iii) engaged gear ratio (GR) and to process same in accordance with logic rules to issue command output signals to a plurality of system actuators including at least a fuel control system actuator, said transmission system comprising a portion of a vehicular driveline having a predetermined maximum desirable output shaft torque (max OS torq) said control system characterized by said logic rules including rules:

for determining a maximum engine speed (ES_max) as a function of (i) said maximum desirable output shaft torque, (ii) sensed input shaft speed, (III) mechanical ratio (gear_ratio) of engaged gear ratio, (iv) torque converter torque ratio (torque_ratio) and (v) torque converter capacity factor (K factor); and for comparing current engine speed to said maximum engine speed and, if said current engine speed exceeds aid maximum engine speed, for issuing command output signals to said fuel control system to fuel said engine for an engine speed (ES) not exceeding said maximum engine speed (ES_max).

10. The control system of claim 9 wherein said maximum desirable output shaft torque (max_OS_torq) is a predetermined constant value determined as a function of vehicular driveline characteristics.

11. The control system of claim 9 wherein said torque converter input element is rotatably fixed to an engine crankshaft (56) and said torque converter output element is rotatably fixed to said transmission input shaft in at least one operational mode of said system (12).

12. The control system of claim 10 wherein said torque converter input element is rotatably fixed to an engine crankshaft (56) and said torque converter output element is rotatably fixed to said transmission input shaft in at least one operational mode of said system (12).

13. A control system for limiting driveline torque applied to a vehicular driveline at a transmission output shaft to a predetermined maximum value (max_OS_torq), said driveline comprising a vehicular automated mechanical transmission system (12) comprising a multiple ratio mechanical transmission (14) having an input shaft (72) and said output shaft (22), each of said ratios (gr) having a known mechanical ratio (gear_ratio) between said input and output shafts, a fuel controlled engine (16), a fluid torque converter (20) having a known torque ratio (torque_ratio) and capacity factor (k factor) drivingly interposed the engine and the transmission, said torque converter having an input element (54) rotating in a known manner with said engine and an output element (60) rotatable in a known manner with said transmission input shaft (72), an operator set throttle control device (32), a fuel control system (34) effective in at least one mode of operation to fuel the engine to rotate at a desired rotational speed regardless of the operator's setting of the throttle control device and an electronic microprocessor based central control unit (50) effective to receive input signals indicative of a status of the transmission system including at least signals indicative of (i) engine speed (ES), (ii) input shaft speed (IS) and (iii) engaged gear ratio (GR) and to process same in accordance with predetermined logic rules to issue command output signals to a plurality of system actuators, including at least a fuel control system actuator, said control system characterized by said logic rules including rules:

for determining a maximum engine speed (ES_max) as a function of the expression:

$$ES\_max = IS + ((K\ factor) * (((max\_OS\_torq)/(gear\ ratio))/(torque\_ratio))^{.5})$$

where:

IS = current input shaft speed;

K factor = capacity factor of the torque converter;

max_OS_torq = predetermined maximum driveline torque as applied at transmission output shaft, determined as a function of driveline characteristics;

gear_ratio = mechanical ratio of currently engaged gear ratio; and torque-ratio = torque ratio of the torque converter; and for issuing command output signals to said fuel control system to fuel said engine for an engine speed (ES) not exceeding said maximum engine speed (ES_max).

14. The control system of claim 13 wherein said torque converter input element is rotatably fixed to an engine crankshaft (56) and said torque converter output element is rotatably fixed to said transmission input shaft in at least one operational mode of said system (12).

* * * * *